US007024525B2

(12) United States Patent
Yoder et al.

(10) Patent No.: US 7,024,525 B2
(45) Date of Patent: Apr. 4, 2006

(54) DISTRIBUTED BACKGROUND TRACK PROCESSING

(75) Inventors: Benjamin W. Yoder, Framingham, MA (US); Mark J. Halstead, Watertown, MA (US); David Meiri, Cambridge, MA (US); Alexandr Veprinsky, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 11/200,606

(22) Filed: Aug. 10, 2005

(65) Prior Publication Data

US 2005/0283571 A1 Dec. 22, 2005

Related U.S. Application Data

(63) Continuation of application No. 10/224,006, filed on Aug. 20, 2002, now Pat. No. 6,944,726, which is a continuation-in-part of application No. 09/997,810, filed on Nov. 30, 2001, now Pat. No. 6,862,632.

(60) Provisional application No. 60/332,991, filed on Nov. 14, 2001.

(51) Int. Cl.
*G06F 12/00* (2006.01)

(52) U.S. Cl. ........................ 711/156; 711/147; 711/152; 711/154; 711/162; 711/203; 707/8; 707/10; 707/201; 707/202; 707/203; 707/204; 709/208; 709/217; 709/229; 714/2; 714/4; 714/6; 714/20; 714/21; 714/769; 714/770

(58) Field of Classification Search ..................... None
See application file for complete search history.

*Primary Examiner*—Donald Sparks
*Assistant Examiner*—Jesse Diller
(74) *Attorney, Agent, or Firm*—Muirhead and Saturnelli, LLC

(57) ABSTRACT

Setting a plurality of table entries in a storage device includes subdividing the table entries into a N tasks, placing each of the N tasks in a memory location disposed within the storage device and accessible by a plurality of internal devices, the plurality of the internal devices accessing the memory location to retrieve at least one of the N tasks, and each of the plurality of the internal devices setting table entries corresponding to at least one of the N tasks retrieved from the memory location. Setting table entries may also include setting logical device table entries to indicate corresponding tracks contain invalid data in connection with operation of remote data transfer between multiple storage devices.

18 Claims, 5 Drawing Sheets

DISTRIBUTED BACKGROUND TRACK PROCESSING

CROSS REFERENCE TO RELATED APPLICATIONS

This application is a continuation of U.S. patent application Ser. No. 10/224,006, filed Aug. 20, 2002, now U.S. Pat. No. 6,944,726, which is a continuation in part of U.S. patent application Ser. No. 09/997,810, filed on Nov. 30, 2001 now U.S. Pat. No. 6,862,632, which is incorporated by reference herein and which claims priority to U.S. provisional patent application No. 60/332,991, filed on Nov. 14, 2001.

BACKGROUND OF THE INVENTION

1. Technical Field

This application relates to computer storage devices, and more particularly to the field of handling remote computer storage device.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may nor correspond to the actual disk drives. Allowing multiple host systems to access the single storage device unit allows the host systems to share data stored therein.

In some instances, it may be desirable to copy data from one storage device to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by the Remote Data Facility (RDF) product provided by EMC Corporation of Hopkinton, Mass. With RDF, a user may denote a first storage device as a master storage device and a second storage device as a slave storage device. Other incarnations of RDF may provide a peer to peer relationship between the local and remote storage devices. The host interacts directly with the local storage device, but any data changes made to the local storage device are automatically provided to a remote storage device using RDF. The local and remote storage devices may be connected by a data link, such as an ESCON link or a Fiber Channel link. The RDF functionality may be facilitated with an RDF adapter (RA), or a plurality of RA's, provided at each of the storage devices.

Implementation of RDF is facilitated using tables that indicate which tracks of data need to be modified at each location. For example, a local storage device having an RDF connection to a remote storage device may keep a table indicating which tracks have been written on the local storage device but not yet pushed (i.e., communicated via a data link) to the remote storage device. The table, called a "track table" contains an entry indicating the status of each track of the remote storage device. A track of the remote storage device is indicated as "invalid" after the data on the local storage device has been modified but before the modified data has been copied to the remote storage device. A track invalid condition may also occur when an RDF connection or configuration is initialized.

Tracks of a track table may be marked invalid by first reading a track into memory, or by at least reserving a slot for the track in the cache memory of the storage device. Once this has occurred, a process that modifies track table data entries of a track table may obtain a software lock for the track allowing exclusive access to the corresponding table data entry. The process may then modify the track table data entry corresponding to the track to mark the track as invalid. However, upon initialization of an RDF connection, it may be necessary to mark a significant number tracks as invalid. Reserving a cache slot for each of the tracks, locking each with a software lock, making the modification, and then releasing the lock could take a significant amount of time. In addition, reserving the necessary cache slots could cause other stored data not related to the initialization which is being used by other processes to be removed from cache, thus introducing additional inefficiencies. Accordingly, it would be useful to provide a mechanism for allowing setting invalid a large number of track table data entries without having to reserve a cache slot for each entry.

SUMMARY OF THE INVENTION

According to the present invention, setting a plurality of table entries in a storage device includes subdividing the table entries into a N tasks, placing each of the N tasks in a memory location disposed within the storage device and accessible by a plurality of internal devices, the plurality of the internal devices accessing the memory location to retrieve at least one of the N tasks, and each of the plurality of the internal devices setting table entries corresponding to at least one of the N tasks retrieved from the memory location. Setting table entries may also include setting logical device table entries to indicate corresponding tracks contain invalid data in connection with operation of remote data transfer between multiple storage devices. At least some of the internal devices may include devices for handling remote data transfer between multiple storage devices. At least some of the internal devices may be disk adapters and host adapters of the storage device. The memory location may correspond to a queue. Setting a plurality of table entries may also include, following setting table entries corresponding to at least one of the N tasks, providing an indicator in the memory location that the at least one of the N tasks has been completed. Setting a plurality of table entries may also include at least one of the internal devices placing the N tasks in the memory location and monitoring the memory location for the indicators indicating that each of the N tasks have been successfully completed. Setting a plurality of table entries may also include the at least one of the internal devices replacing a particular one of the tasks in the memory location in response to absence of an indicator indicating successful completion for the particular one of the tasks after a predetermined amount of time. Setting device table entries may also include obtaining a hardware lock corresponding to each of the device table entries to be set. Setting device table entries may also include, in response to a particular entry not being in cache, obtaining a hardware lock for the particular entry. Setting device table entries may also include, in response to the particular entry being in cache, obtaining a software lock for the entry. Setting device table entries may also include, in response to the particular entry being in cache, marking the particular entry for later processing. The later processing may include waiting for the entry to not be in cache and then obtaining the hardware lock for the entry.

According further to the present invention, a computer program product that sets a plurality of table entries in a storage device, includes executable code that subdivides the table entries into a N tasks, executable code that places each of the N tasks in a memory location disposed within the storage device and accessible by a plurality of internal devices, executable code that accesses the memory location on behalf of the internal storage devices to retrieve at least one of the N tasks, and executable code that sets table entries corresponding to at least one of the N tasks retrieved from the memory location on behalf of each of the plurality of the internal devices. The executable code that sets table entries may include executable code that sets logical device table entries to indicate corresponding tracks contain invalid data in connection with operation of remote data transfer between multiple storage devices. The memory location may correspond to a queue. The computer program product may also include executable code that provides an indicator in the memory location that the at least one of the N tasks has been completed following setting table entries corresponding to at least one of the N tasks. The computer program product may also include executable code that monitors the memory location for the indicators indicating that each of the N tasks have been successfully completed. The computer program product may also include executable code that replaces a particular one of the tasks in the memory location in response to absence of an indicator indicating successful completion for the particular one of the tasks after a predetermined amount of time. The executable code that sets device table entries may include executable code that obtains a hardware lock corresponding to each of the device table entries to be set. The executable code that sets device table entries may include executable code that obtains a hardware lock for the particular entry in response to a particular entry not being in cache. The computer program product may also include executable code that obtains a software lock for the entry in response to the particular entry being in cache. The computer product may also include executable code that marks the particular entry for later processing in response to the particular entry being in cache. The later processing may include waiting for the entry to not be in cache and then obtaining the hardware lock for the entry.

According further to the present invention, an apparatus that sets a plurality of table entries in a storage device includes means for subdividing the table entries into a N tasks, means for placing each of the N tasks in a memory location disposed within the storage device and accessible by a plurality of internal devices, means for the internal devices to access the memory location to retrieve at least one of the N tasks, and means for each of the plurality of the internal devices to set table entries corresponding to at least one of the N tasks retrieved from the memory location. The means for the internal devices to set table entries may include means for setting logical device table entries to indicate corresponding tracks contain invalid data in connection with operation of remote data transfer between multiple storage devices.

DETAILED DESCRIPTION OF VARIOUS EMBODIMENTS

Figure 1:
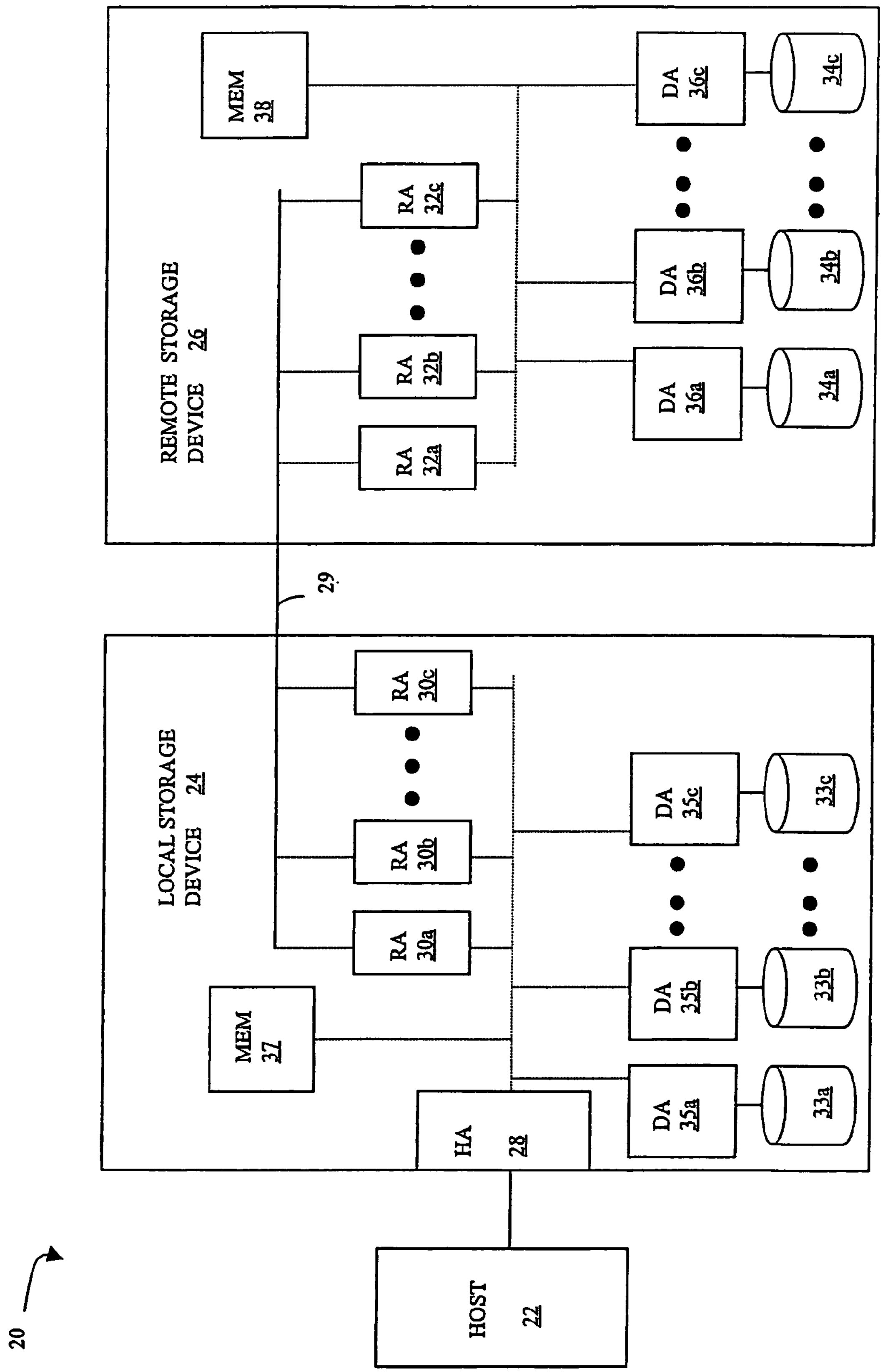
FIG. 1 is a schematic diagram showing a host, a local storage device, and a remote data storage device used in connection with the system described herein.

Referring to FIG. 1, a diagram 20 shows a relationship between a host 22, a local storage device 24 and a remote storage device 26. The host 22 reads and writes data from and to the local storage device 24 via a host adapter 28, which facilitates the interface between the host 22 and the local storage device 24. Data from the local storage device 24 is copied to the remote storage device 26 via an RDF link 29 to cause the data on the remote storage device 26 to be identical to the data on the local storage device 24. Although only the one link 29 is shown, it is possible to have additional links between the storage devices 24, 26 and to have links between one or both of the storage devices 24, 26 and other storage devices (not shown). Note that there may be a time delay between the transfer of data from the local storage device 24 to the remote storage device 26, so that the remote storage device 26 may, at certain points in time, contain data that is not identical to the data on the local storage device 24. Communication using RDF is described, for example, in U.S. Pat. No. 5,742,792, which is incorporated by reference herein.

The local storage device 24 includes a first plurality of RDF adapter units (RA's) 30_a_, 30_b_, 30_c_ and the remote storage device 26 includes a second plurality of RA's 32_a_, 32_b_, 32_c_. The RA's 30_a_–30_c_, 32_a_–32_c_ are coupled to the RDF link 29 and are similar to the host adapter 28, but are used to transfer data between the storage devices 24, 26. The software used in connection with the RA's 30_a_–30_c_, 32_a_–32_c_ is discussed in more detail hereinafter.

The storage devices 24, 26 may include one or more disks, each containing a different portion of data stored on each of the storage devices 24, 26. FIG. 1 shows the storage device 24 including a plurality of disks 33_a_, 33_b_, 33_c_ and the storage device 26 including a plurality of disks 34_a_, 34_b_, 34_c_. The RDF functionality described herein may be applied so that the data for at least a portion of the disks 33_a_–33_c_ of the local storage device 24 is copied, using RDF, to at least a portion of the disks 34_a_–34_c_ of the remote storage device 26. It is possible that other data of the storage devices 24, 26 is not copied between the storage devices 24, 26, and thus is not identical.

Each of the disks 33_a_–33_c_ is coupled to a corresponding disk adapter unit (DA) 35_a_, 35_b_, 35_c_ that provides data to a corresponding one of the disks 33_a_–33_c_ and receives data from a corresponding one of the disks 33_a_–33_c_. Similarly, a plurality of DA's 36_a_, 36_b_, 36_c_ of the remote storage device 26 are used to provide data to corresponding ones of the disks 34_a_–34_c_ and receive data from corresponding ones of the disks 34*a*–34*c*. An internal data path exists between the DA's 35*a*–35*c*, the HA 28 and the RA's 30*a*–30*c* of the local storage device 24. Similarly, an internal data path exists between the DA's 36*a*–36*c* and the RA's 32*a*–32*c* of the remote storage device 26.

The local storage device 24 also includes a global memory 37 that may be used to facilitate data transferred between the DA's 35*a*–35*c*, the HA 28 and the RA 30. The memory 37 may contain parameters from system calls (admin-type calls), tasks that are to be performed by one or more of the DA's 35*a*–35*c*, the HA 28 and the RA's 30*a*–30*c*, and a cache for data fetched from one or more of the disks 33*a*–33*c*. Similarly, the remote storage device 26 includes a global memory 38 that may contain parameters from system calls, tasks that are to be performed by one or more of the DA's 36*a*–36*c* and the RA's 32*a*–32*c*, and a cache for data fetched from one or more of the disks 34*a*–34*c*. Use of the memories 37, 38 is described in more detail hereinafter.

The storage space in the local storage device 24 that corresponds to the disks 33*a*–33*c* may be subdivided into a plurality of volumes or logical devices. The logical devices may or may not correspond to the physical storage space of the disks 33*a*–33*c*. Thus, for example, the disk 33*a* may contain a plurality of logical devices or, alternatively, a single logical device could span both of the disks 33*a*, 33*b*. Similarly, the storage space for the remote storage device 26 that comprises the disks 34*a*–34*c* may be subdivided into a plurality of volumes or logical devices, where each of the logical devices may or may not correspond to one or more of the disks 34*a*–34*c*.

Providing an RDF mapping between portions of the local storage device 24 and the remote storage device 26 involves setting up a logical device on the remote storage device 26 that is a remote mirror for a logical device on the local storage device 24. The host 22 reads and writes data from and to the logical device on the local storage device 24 and the RDF mapping causes modified data to be transferred from the local storage device 24 to the remote storage device 26 using the RA's, 30*a*–30*c*, 32*a*–32*c* and the RDF link 29. In steady state operation, the logical device on the remote storage device 26 contains data that is identical to the data of the logical device on the local storage device 24. The logical device on the local storage device 24 that is accessed by the host 22 is referred to as the "R1 volume" (or just "R1") while the logical device on the remote storage device 26 that contains a copy of the data on the R1 volume is called the "R2 volume" (or just "R2"). Thus, the host reads and writes data from and to the R1 volume and RDF handles automatic copying and updating of the data from the R1 volume to the R2 volume.

Figure 2:
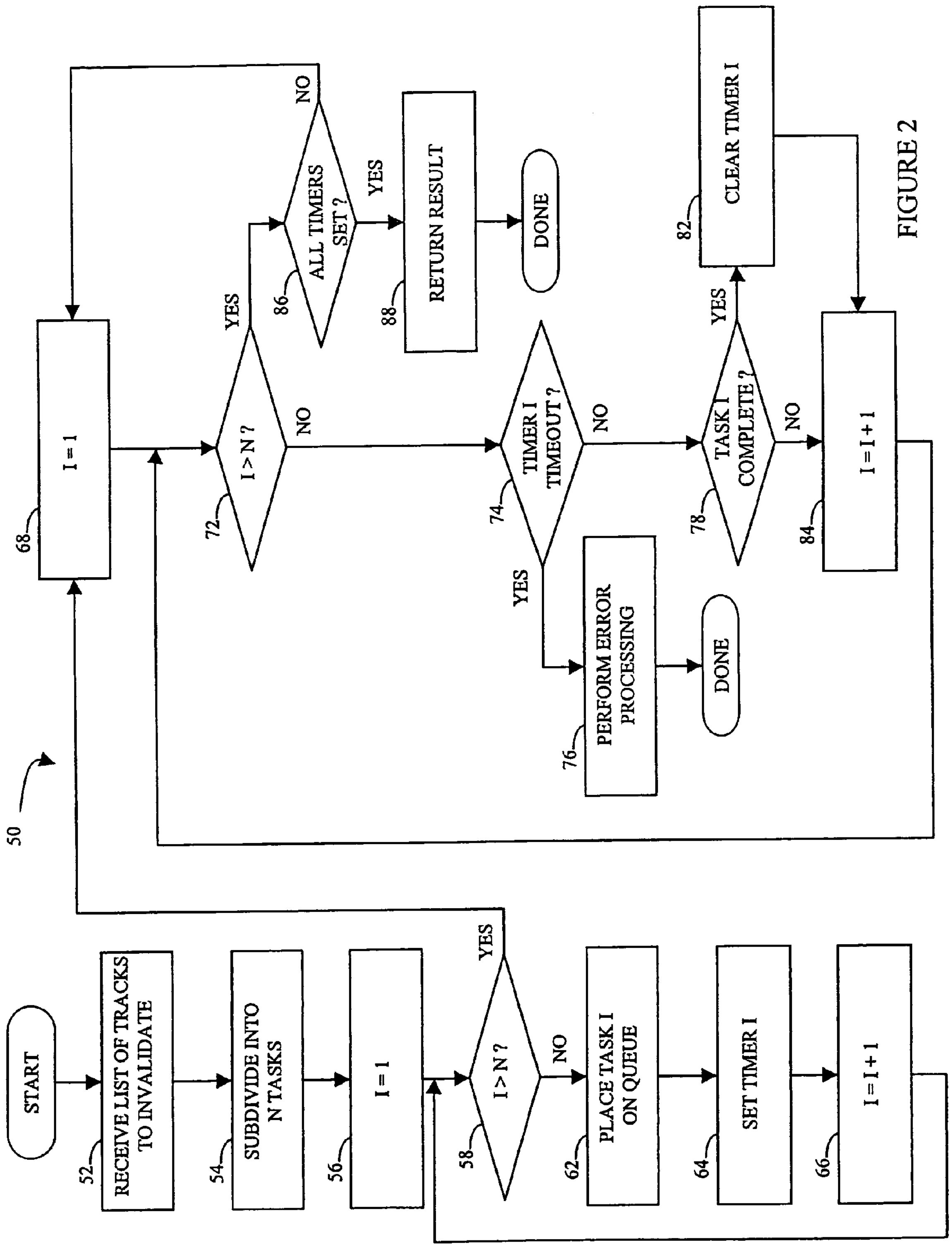
FIG. 2 is a flow chart illustrating steps performed in connection with invalidating a large number of tracks according to the system described herein.

Referring to FIG. 2, a flowchart 50 illustrates steps performed in connection with invalidating table data entries for a number of tracks to indicate, for example, that the appropriate track data has not yet been pushed from a source (R1) to a remote mirror destination (R2). A large number of track table data entries may need to be invalidated if, for example, an RDF connection is being initialized and/or if, using dynamic RDF, the RDF configuration is changed so that a new R2, or set of R2's, is being provided or if a swap R1/R2 is being performed.

Processing begins at a first step 52 where an RA receives a list of tracks to be invalidated. The list of tracks received at the step 52 may include tracks for a plurality of devices that have been just initialized or have been provided in connection with dynamic RDF configuration/reconfiguration. Although the embodiment illustrated herein shows using an RA to perform the steps of the flow chart 50, it is possible for other embodiments to use other components of the storage device 24 or the storage device 26 to perform the steps.

Following the step 52 is a step 54 where the RA that receives the list of tracks to be invalidated divides the tracks into N separate tasks where each of the N tasks may be performed by another device. Each of the N tasks represents invalidating a subset of the list of tracks. In one embodiment, each of the N tasks includes sixtyfour logical devices that have track table entries that need to be invalidated. In other embodiments, each of the tasks may contain any number of track table entries that need to be invalidated. For example, each task could correspond to a particular device that needs to have all of the track table entries set invalid. The number of track table entries that need to be invalidated for each of the separate tasks provided at the step 54 need not be the same.

Following the step 54 is a step 56 where an index variable, I, is set to one. The variable I is used to iterate through each of the N tasks. Following the step 56 is a test step 58 where it is determined if I is greater than N, the number of tasks. If not, then control passes from the step 58 to a step 62 where task I (i.e., one of the tasks provided at the step 54) is placed on a queue that is serviced in a manner described elsewhere herein. The queue may exist in the memory 37 or the memory 38 and may be serviced by, for example, the RAs 30*a–c* in the case of the memory 37 or may be serviced by, for example, the RAs 32*a–c* in the case of the memory 38. The queue may be a general purpose queue that includes task and status messages used by devices in each of the storage devices 24, 26 for communication and sharing of tasks within each of the storage devices 24, 26 or may be any other queue or other appropriate mechanism capable of providing the functionality described herein.

Following the step 62 is a step 64 where a timer for task I is set. The timer set at the step 64 may be used to cause a time out condition to occur if the task I is not serviced in an appropriate amount of time, as described in more detail elsewhere herein. Following the step 64 is a step 66 where the index variable, I, is incremented. Following the step 66, control passes back to the test step 58.

If it is determined at the test step 58 that the index variable, I, is greater than N (the number of tasks), then control passes from the test step 58 to a step 68 where the index variable, I, is set to one. Following the step 68 is a test step 72 where it is determined if the index variable, I, is greater than N. If not, then control passes from the step 72 to a test step 74 where it is determined if the timer I (set at the step 64) has timed out. If it is determined at the test step 74 that the timer I has timed out, then control passes from the step 74 to a step 76 where error processing occurs. The error processing at step 76 could include, for example, the RA processing the task itself or the RA simply placing a duplicate of the task on the queue to have another device service the task. Following the step 76, processing is complete. However, note that if the processing at the step 76 is error recovery, then following step 76, it may be necessary to process the other timers and thus go back to the step 68 (or perform equivalent processing) in alternative embodiments.

If it is determined at the test step 74 that the timer I has not timed out, then control passes from the step 74 to a test step 78 where it is determined if task I has been completed. As discussed in more detail below, a device that services task I may put a status message on the queue to indicate to the RA that placed the task on the queue that the task is complete. If it is determined at the test step 78 that the task I is complete, control passes from the step 78 to a step 82 where the timer for task I, timer I, is cleared. Following the step 82 is a step 84 where the index variable, I, is incremented. Note that the step 84 follows the test step 78 directly if it is determined at the test step 78 that task I is not complete. Following the step 84, control transfers back to the test step 72 to determine if the index variable I, is greater than N, the number of tasks.

If it is determined at the test step 72 that the index variable I is greater than N (the number of tasks), then control passes from the test step 72 to a test step 86 where it is determined if all of the timers are clear. If so, then control passes from the test step 86 to a step 88 where a result is returned to, for example, a remote RA to indicate that all of the invalid track table data entries have been properly set. Note that clearing the timers at the step 82 indicates that a task I has been complete so if all the timers are clear at the step 86, then all of the track table data entries have been successfully set to indicate that the corresponding tracks are invalid. Following step 88, processing is complete.

If it is determined at the test step 86 that all the timers are not clear, then control passes from the step 86 back to the step 68 where the index variable, I, is set to one, in order to iterate through the tasks and the timers again to determine which tasks are complete and whether any of the timers have timed out. Note that, on second and subsequent iterations, it may be possible to forgo the test steps 74, 76 for tasks corresponding to timers that have already been cleared (i.e., completed tasks).

Figure 3:
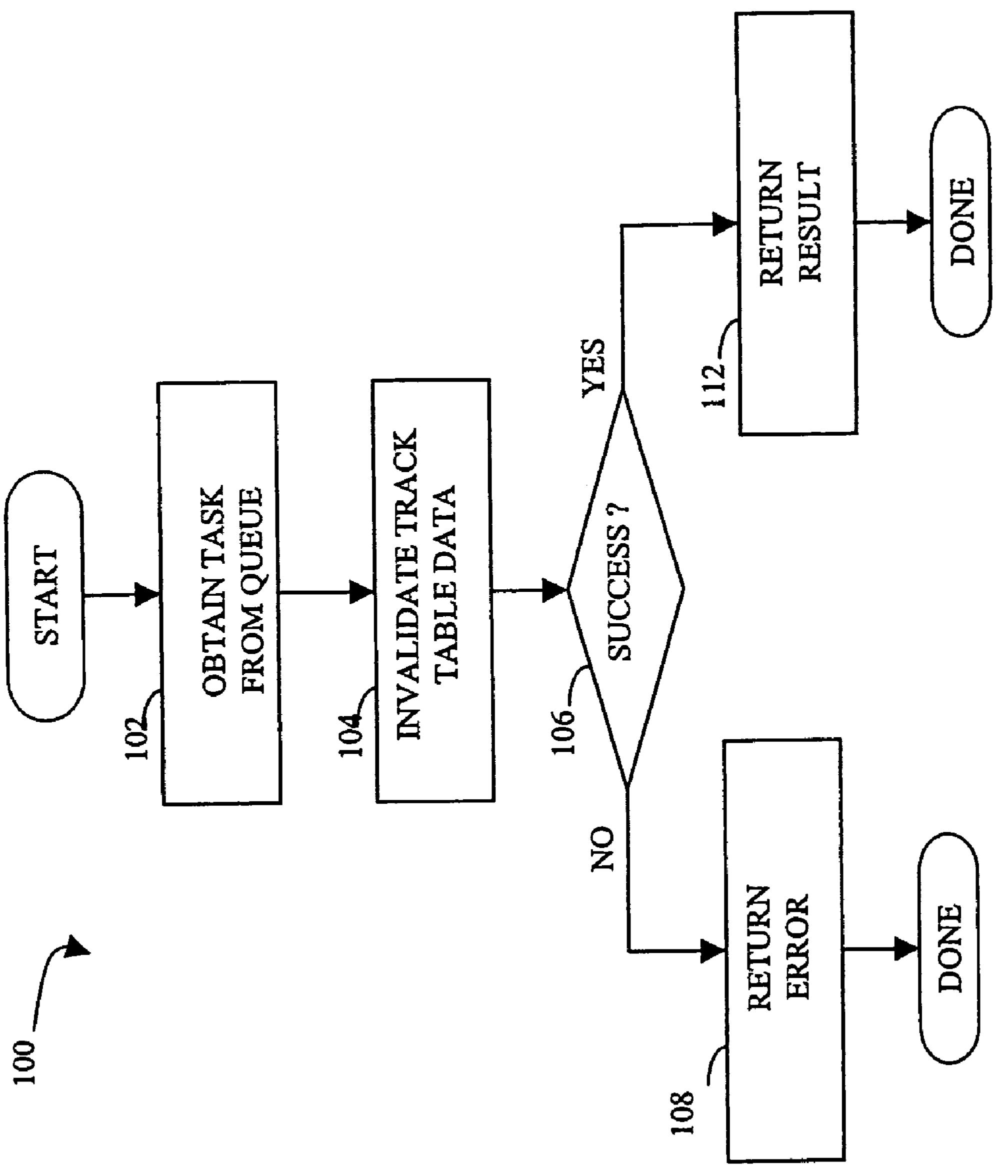
FIG. 3 is a flow chart illustrating steps performed by a process invalidating a subset of tracks according to the system described herein.

Referring to FIG. 3, a flowchart 100 illustrates steps performed by a device servicing the tasks placed on the queue by the RA (or other device) that performs the steps of the flowchart 50 of FIG. 2. The devices which may service the tasks on the queue include other RA's, the DA's, and any HA's. Thus, for example, if the RA 30_c_ receives a command to invalidate a large number of track table data entries, the RA 30_c_ may perform the steps of the flowchart 50 of FIG. 2 to place a number of tasks on the queue in the memory 37 and to monitor the state of the tasks. The tasks may be serviced, however, by other ones of the RA's such as the RA 30_a_ and/or the RA 30_b_. In addition, the tasks may be serviced by one or more of the DA's 35_a_, 35_b_, 35_c_ and/or the HA 28. All that is necessary for a device to be able to service the task is that the device be given access to data in the queue in the memory 37 and the device be capable of causing track table data entries to be invalidated as described herein. Invalidating track table data entries of a device is described in more detail hereinafter.

Processing for the flowchart 100 begins at a first step 102 where the device obtains a task from the queue which indicates which track table data entries need to be invalidated. Following the step 102 is a step 104 where the track table data entries are invalidated. The processing at the step 104 is described in more detail hereinafter.

Following the step 104 is a test step 106 where it is determined if invalidating the track table data entries at the step 104 was successful. If not, then control transfers from the step 106 to a step 108 where an error is returned. An error may be returned by placing a specific indicator on the queue for the RA (or other device) to pick up. Alternatively, an error condition may be signaled by simply not returning any status, and thus causing the RA to detect a time out at the step 74 of FIG. 2.

If it is determined at the test step 106 that invalidating the track table data entries at the step 104 was successful, then control transfers from the step 106 to a step 112 where success is returned. Note that the task complete test step 78 of the flowchart 50 of FIG. 2 may determine if a task is complete by detecting a success indicator returned at the step 112. Accordingly, an error being returned at the step 108 of the flowchart 100 of FIG. 3 may cause the task complete test step 78 of the flowchart 50 of FIG. 2 to determine that the task is not complete.

Figure 4:
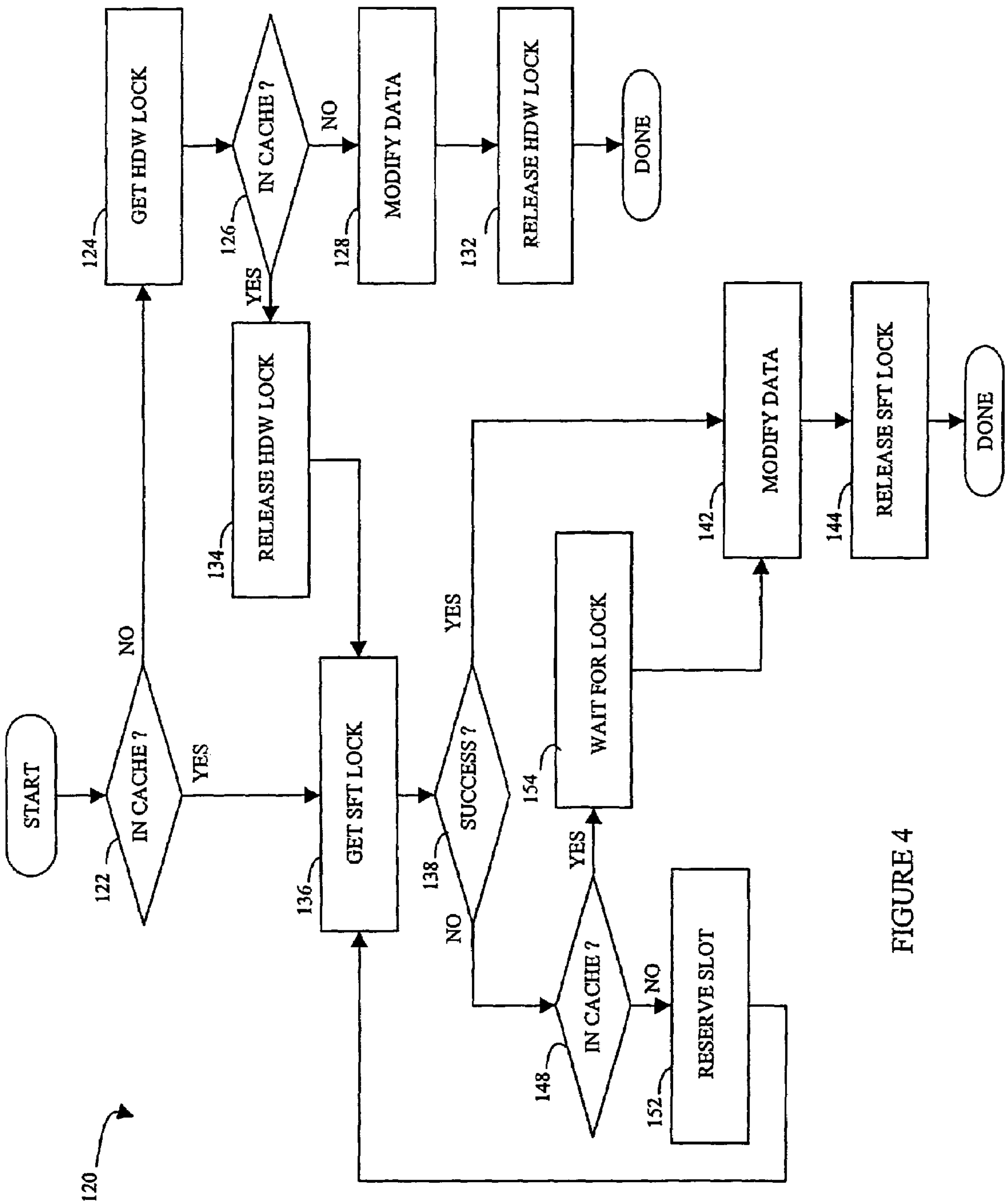
FIG. 4 is a flow chart illustrating steps performed in connection with invalidating tracks according to the system described herein.

Referring to FIG. 4, a flowchart 120 illustrates steps performed in connection with setting the track table data entries at the step 104 of the flowchart 100 of FIG. 3. The flowchart 120 illustrates the steps performed for each of the track table data entries. To set a plurality of track table data entries to invalid, it would be necessary to iterate through each of the entries using the steps illustrated by the flowchart 120.

Processing begins at a first step 122 where it is determined if the track corresponding to the track table data entry to be set invalid is in cache. The test at the step 122 determines if there is a slot in cache memory assigned to the track corresponding to the track table data entry to be modified. If not, then control transfers from the step 122 to a step 124 where a hardware lock for the track table data entry corresponding to the track is obtained. The hardware lock prevents any other process from accessing the memory corresponding to the track table data entry once a first process has obtained the hardware lock. Following the step 124 is a test step 126 where it is determined if the track corresponding to the track table data entry is in cache (or if a cache slot has been assigned to the track). Note that a cache slot may be assigned to a track after executing the step 122 but prior to executing the step 124. If there is not a slot in cache for the track, then control transfers from the step 126 to a step 128 where the table data entry is modified to invalidate the track. Following the step 128 is a step 132 where the hardware lock is released. Following the step 132, processing is complete.

If it is determined at the test step 126 that there is a slot in cache for the track corresponding to the track table data entry, then control transfers from the step 126 to a step 134 where the hardware lock is released. Following the step 134 is a step 136 where the software lock for the track (and thus the track table data entry) is obtained. The software lock is like the hardware lock in that the software lock provides for exclusive access to the data. In an embodiment herein, each of the slots in the cache and corresponding track table data entries have a separate software lock. Note that the step 136 follows the test step 122 if it is determined at the test step 122 that the track corresponding to the track table data entry already has a cache slot assigned thereto.

Following the step 136 is a test step 138 where it is determined if obtaining the software lock at the step 136 was successful. If so, then control transfers from the step 138 to a step 142 where the data of the track table data entry is modified in a manner similar to the modification performed at the step 128 to indicate that the track is invalid. Following the step 142 is a step 144 where the software lock is released. Following the step 144, processing is complete.

If it is determined at the test step 138 that obtaining the software lock at the step 136 was not successful, then control transfers from the step 138 to a step 148 where it is determined if the track is still in cache. Note that it is possible for the track to have been removed from the cache after one of the step 122, 126 was executed. If it is determined at the test step 148 that the track is not in cache, then control transfers from the step 148 to a step 152 where the track is read into cache, or more precisely, a slot is reserved for the track in the cache. Following the step 152, control transfers back to the step 136 to obtain the software lock.

If it is determined at the test step 148 that a slot for the track exists in the cache, then control transfers from the step 148 to a step 154 to wait for the software lock. It is possible that failure at the test step 138 to get the software lock at the step 136 may be the result of another process having the software lock. Accordingly, if it is determined at the test step 138 that obtaining the software lock at the step 136 was unsuccessful but it is also determined at the test step 148 that the track in question still has a corresponding slot entry in the cache, then it is appropriate to wait for the lock at the step 154. Following the step 154 (i.e., once the software lock is released by another process and is obtained by the process executing the steps of the flow chart 120), control transfers from the step 154 to the step 142, discussed above.

Figure 5:
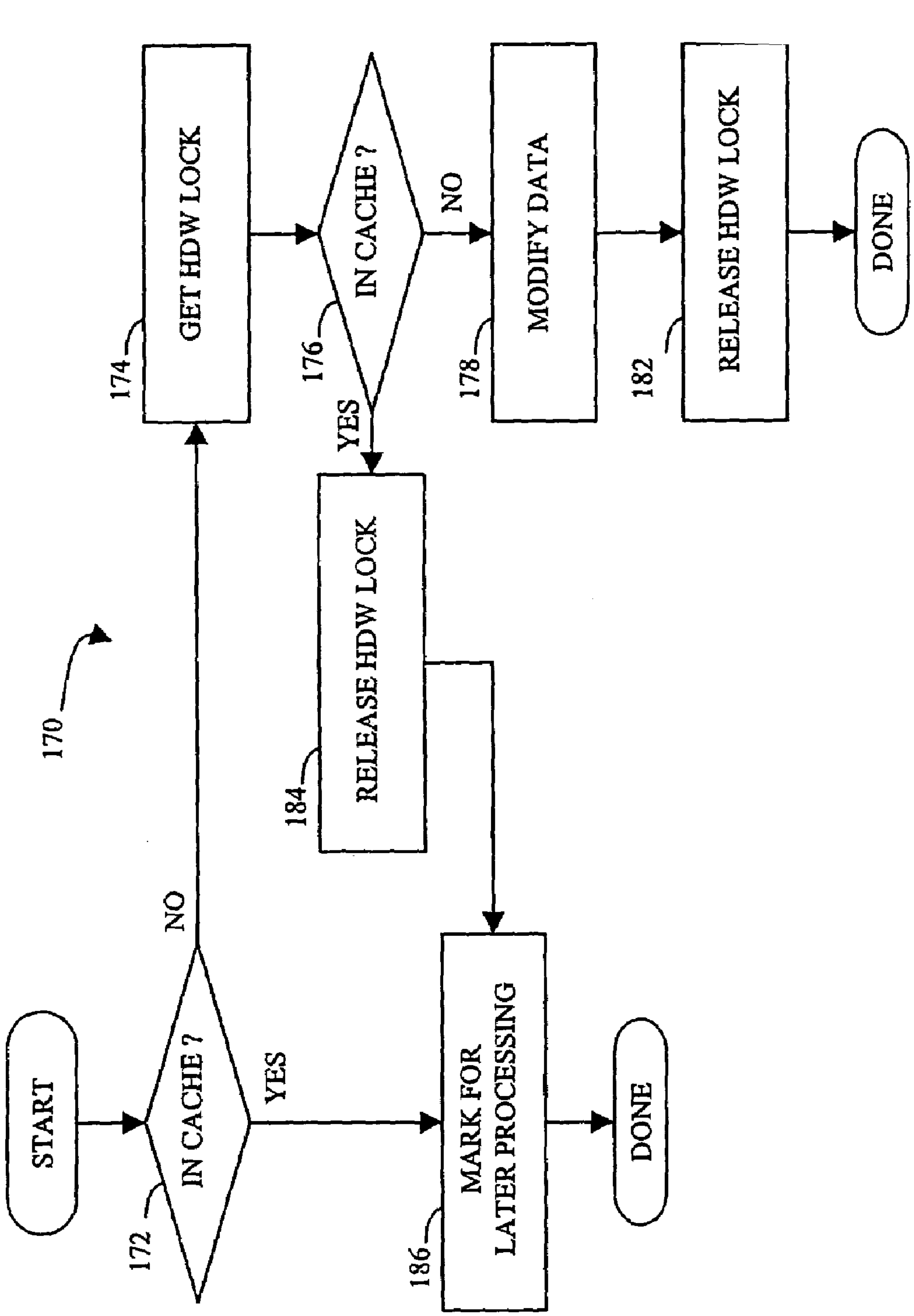
FIG. 5 is a flowchart illustrating alternative steps for invalidating tracks according to the system described herein.

Referring to FIG. 5, a flowchart 170 illustrates steps performed in an alternative embodiment for invalidating tracks of a device. Processing begins at a first step 172 where it is determined if the track in question has a corresponding slot entry in cache. If not, then control transfers from the step 172 to a step 174 where the hardware lock is obtained. Following step 174 is a test step 176 where it is determined if the track is in cache (i.e., was placed in cache by another process after the step 172 was executed but before the step 174 was executed). If the track is not in cache, then control transfers from the step 176 to a step 178 where the table data is modified to indicate that the track in question is invalid. Following the step 178 is a step 182 where the hardware lock is released. Following the step 182, processing is complete.

If it is determined at the test step 176 that the data is in cache, then control transfers to a step 184 where the hardware lock is released. Following the step 184, or following the step 172 if the track was in cache is a step 186 where the track that is being processed is marked for later processing. The later processing could include the processing illustrated by the flowchart 170. Alternatively, the later processing could be the processing illustrated by the flowchart 120 of FIG. 4, or some combination of the steps of the flowchart 120 with the steps of the flowchart 170, or some other process that may be used to process tracks at a later time, perhaps after the tracks are no longer in cache.

While the invention has been disclosed in connection with various embodiments, modifications thereon will be readily apparent to those skilled in the art. Accordingly, the spirit and scope of the invention is set forth in the following claims.

What is claimed is:

1. A data storage device, comprising:

a plurality of host adaptor units that transfer data to and from the storage device;

a plurality of disk adaptor units, coupled to the host adaptor units, that exchange data with the host adaptor units;

a plurality of disk drives coupled to the disk adaptor units;

a plurality of remote adaptor units, coupled to the host adaptor units and the disk adaptor units, that handle remote data transfer between multiple storage devices; and a memory, coupled to the host adaptor units, the disk adaptor units, and the remote adaptor units, the memory containing a table having a plurality of entries, wherein the entries are set by being subdived into N tasks that correspond to a list of tracks to be invalidated that is provided by a first one of the adaptor units, placing each of the N tasks in a memory location disposed within the storage device and accessible by at least a second one of the adaptor units, different from the first one of the adaptor units, that access the memory location to retrieve at least one of the N tasks and that sets table entries corresponding to at least one of the N tasks retrieved from the memory location.

2. A data storage device, according to claim 1, wherein table entries are set by setting logical device table entries to indicate corresponding tracks contain invalid data in connection with operation of remote data transfer between multiple storage devices.

3. A data storage device, according to claim 1, wherein the first adaptor unit is a remote adaptor unit.

4. A data storage device, according to claim 3, wherein the second adaptor unit is selected from the group consisting of: disk adapters and host adapters.

5. A data storage device, according to claim 1, wherein the memory location corresponds to a queue.

6. A data storage device, according to claim 1, further comprising:

a hardware lock that is obtained in accordance with each of the device table entries being set.

7. A data storage device, comprising:

a plurality of host adaptor units that transfer data to and from the storage device;

a plurality of disk adaptor units, coupled to the host adaptor units, that exchange data with the host adaptor units;

a plurality of disk drives coupled to the disk adaptor units;

a plurality of remote adaptor units, coupled to the host adaptor units and the disk adaptor units, that handle remote data transfer between multiple storage devices; and a memory, coupled to the host adaptor units, the disk adaptor units, and the remote adaptor units, the memory containing a table having a plurality of entries, wherein the entries are set by being subdivided into N tasks, placing each of the N tasks in a memory location disposed within the storage device and accessible by the adaptor units, at least one of the adaptor units accessing the memory location to retrieve at least one of the N tasks, setting table entries corresponding to at least one of the N tasks retrieved from the memory location, and following setting table entries corresponding to at least one of the N tasks, providing an indicator in the memory location that the at least one of the N tasks has been completed wherein a second one of the adaptor units places the N tasks in the memory location and monitors the memory location for the indicators indicating that each of the N tasks have been successfully completed.

8. A data storage device, according to claim 7, wherein the at least one of the adaptor units replaces a particular one of the tasks in the memory location in response to absence of an indicator indicating successful completion for the particular one of the tasks after a predetermined amount of time.

9. A data storage device, according to claim 7, wherein table entries being set includes setting logical device table entries to indicate corresponding tracks contain invalid data in connection with operation of remote data transfer between multiple storage devices.

10. A data storage device, according to claim 7, wherein the memory location corresponds to a queue.

11. A method, according to claim 7, wherein setting table entries includes obtaining a hardware lock corresponding to each of the table entries to be set.

12. A data storage device, comprising:

a plurality of host adaptor units that transfer data to and from the storage device;

a plurality of disk adaptor units, coupled to the host adaptor units, that exchange data with the host adaptor units;

a plurality of disk drives coupled to the disk adaptor units;

a plurality of remote adaptor units, coupled to the host adaptor units and the disk adaptor units, that handle remote data transfer between multiple storage devices; and a memory, coupled to the host adaptor units, the disk adaptor units, and the remote adaptor units, the memory containing a table having a plurality of entries, wherein the entries are set by being subdivided into N tasks, placing each of the N tasks in a memory location disposed within the storage device and accessible by the adaptor units, the adaptor units accessing the memory location to retrieve at least one of the N tasks, and each of the adaptor units setting table entries corresponding to at least one of the N tasks retrieved from the memory location, wherein setting device table entries includes: in response to a particular entry not being in cache, obtaining a hardware lock for the particular entry.

13. A data storage device, according to claim 12, wherein setting table entries further includes, in response to the particular entry being in cache, obtaining a software lock for the entry.

14. A data storage device, according to claim 12, wherein setting table entries further includes, in response to the particular entry being in cache, marking the particular entry for later processing.

15. A data storage device, according to claim 14, wherein the later processing includes waiting for the entry to not be in cache and then obtaining the hardware lock for the entry.

16. A data storage device, according to claim 12, wherein setting table includes setting logical device table entries to indicate corresponding tracks contain invalid data in connection with operation of remote data transfer between multiple storage devices.

17. A data storage device, according to claim 12, wherein the memory location corresponds to a queue.

18. A data storage device, according to claim 12, wherein following setting table entries corresponding to at least one of the N tasks, an indicator is provided in the memory location to indicate that the at least one of the N tasks has been completed.

* * * * *